UNITED STATES PATENT OFFICE.

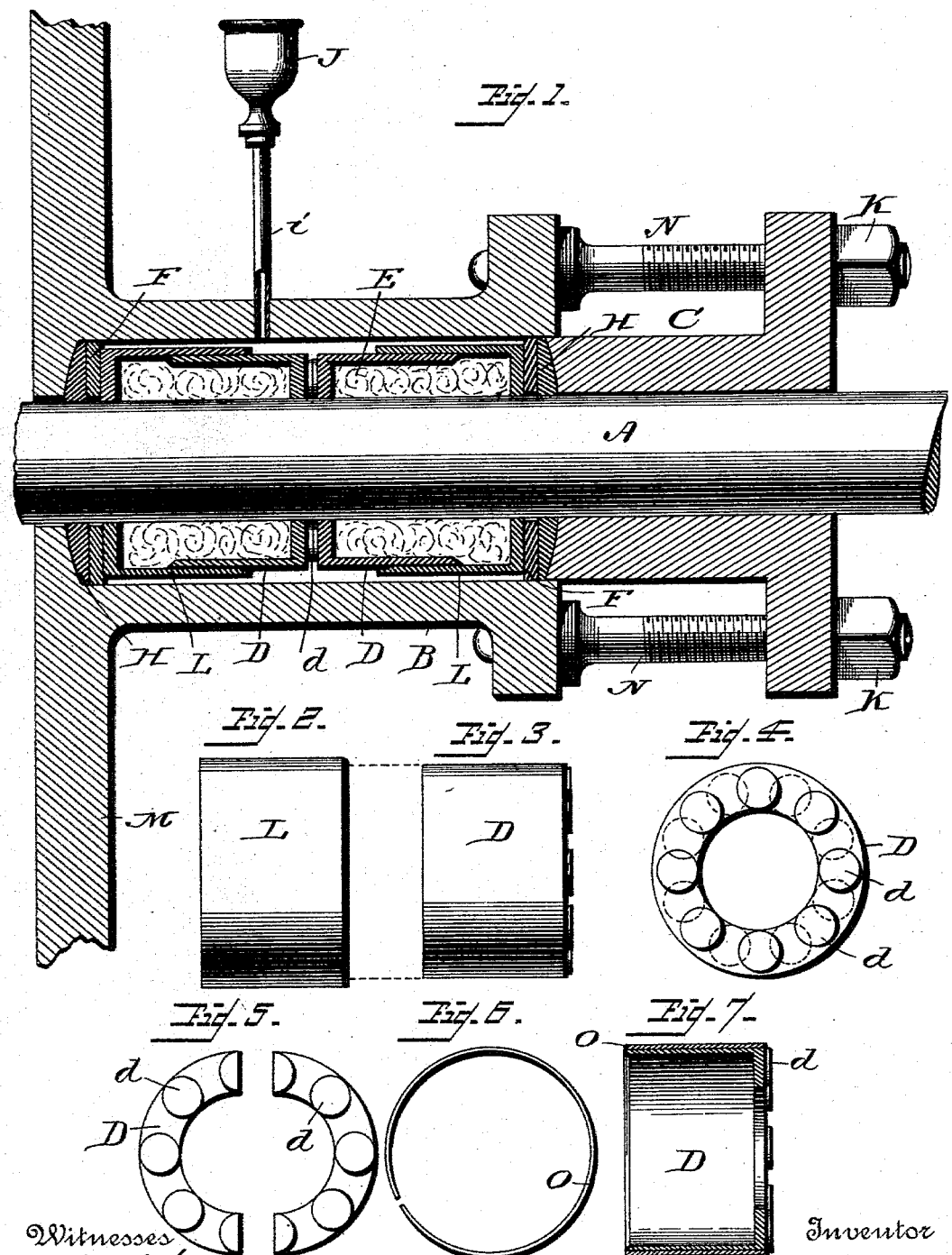

CYRUS S. DEAN, OF FORT ERIE, CANADA, ASSIGNOR, BY DIRECT AND MESNE ASSIGNMENTS, OF ONE-HALF TO CHARLES O. RANO, OF BUFFALO, NEW YORK.

PISTON-ROD PACKING.

SPECIFICATION forming part of Letters Patent No. 494,980, dated April 4, 1893.

Application filed April 30, 1892. Serial No. 431,355. (No model.)

*To all whom it may concern:*

Be it known that I, CYRUS S. DEAN, a subject of the Queen of Great Britain, residing at Fort Erie, in the county of Welland, Province of Ontario, Canada, have invented certain new and useful Improvements in Piston-Rod Packings; and I do hereby declare the following to be a full, clear, and exact description of the invention, such as will enable others skilled in the art to which it appertains to make and use the same.

This invention relates to packing for piston and other rods where it is designed to preserve a close joint and lubricate the said rod.

The object of the invention is to obtain a steam tight joint between the piston rod and the cylinder head through which the said rod works and at the same time prevent burning of the packing and an unnecessary wear of the rod, the latter being effected by a proper lubrication of the said rod.

The improvement consists essentially of the novel features and the peculiar construction and combination of the parts which will be hereinafter more fully described and claimed and which are shown in the annexed drawings, in which—

Figure 1 is a central longitudinal section of a stuffing box and gland, showing the application of the invention and the relative disposition of the parts. Fig. 2 is a side view of the exterior cap of the casing which incloses the packing. Fig. 3 is a side view of the inner cap of the said casing. Fig. 4 is an end view of the inner cap, showing the relative position of the projections on the adjacent caps by dotted lines, *i. e.*, when the two casings are so disposed that the projections on the opposing ends of each stand directly opposite the space between the projections of the other. Fig. 5 is an end view of a modified form of cap, the same being made in halves so as to be readily and conveniently fitted around piston rods of engines now in use thereby obviating the removal of the cross head or piston. Fig. 6 is an end view of the band which is fitted around the parts shown in Fig. 5 to hold them together. Fig. 7 is a section of the cap composed of the parts shown in Figs. 5 and 6.

In the accompanying drawings forming part of the specification the reference letter M indicates the head of the cylinder, B a stuffing box projected from the said head, C a gland, N bolts threaded at their outer end and connected at their inner end with the outer flange of the stuffing box, and K nuts threaded to correspond with the threaded ends of the bolts N on which they are mounted and adapted to advance the gland within the stuffing box to compress the packing therein in the ordinary manner.

The packing is provided in two parts, each part comprising two caps D and L which form a casing, and the textile or compressible packing material E which is inclosed within the said casing. Each of the caps D and L are similarly constructed, the cap D being the smaller and constructed to slide within the open end of the cap L. Projections $d$ provided on the outer ends of the cap D, serve to hold the two parts of the casing sufficiently separated to admit of the lubricant passing between the opposing ends of the said parts and reach the piston rod A so as to lubricate the same. These projections may be of any suitable form, the circular form shown being preferable in that greater clearance space is obtained between them than has been found feasible with other forms. These projections should be close enough together to prevent the projections on one cap extending into the space between the projections of the other cap. This feature of construction is best shown in Fig. 4. The casing of each part of the packing, is of slightly smaller diameter than the stuffing box to permit it to adapt itself to the vibratory motion of the piston rod in the operation of the engine without detriment to any of the other parts. A metal washer F is located at each end of the stuffing box and exterior to this washer is placed a rubber or other flexible gasket H to preserve a steam tight joint at the end of the stuffing box.

The oil cup J is connected with the stuffing box by means of the tube $i$, preferably at a point near the open end of the cap L which is located at the open end of the said stuffing box. The lubricant enters the space between the ends of the cap L and passes between the opposing ends of the cap D to the piston rod A which takes it up and carries it to the right and the left to effectively and properly lubricate the packing and the piston rod.

In some cases it has been found expedient to construct the cap in two parts, as shown in Fig. 5, as when it is intended to apply the invention to engines now in use thereby obviating the removal of the cross head or piston for purposes of applying the packing. After the two parts of the cap are placed about the piston rod the band O is sprung around them and solder flowed between their opposing sides to secure the parts of the cap and band together by what is known as the sweat joint.

In assembling the parts the flexible packing e is placed within the casing and the latter is slipped on the piston rod, care being observed to have the inner ends of the cap D come opposite to each other so that oil passages will be provided to admit the lubricant passing directly to the piston rod. It will be observed that the lubricant is supplied to the piston rod at a point midway between the ends of the packing, hence there will be no waste of the lubricant because the excess will be wiped off by the said packing as will be readily understood.

Having thus described my invention, what I claim, and desire to secure by Letters Patent, is—

1. The combination with a stuffing box having an oil cup communicating therewith, of two metal casings placed within said stuffing box and mounted on the piston rod and inclosing packing material, the casings having projections integrally formed on their inner ends to abut and form oil spaces between the said inner ends of the casings, substantially as and for the purpose described.

2. The combination with a stuffing box having an oil cup communicating therewith, of two metal casings placed within said stuffing box and mounted on the piston rod and inclosing packing material, each casing consisting of telescoping parts and having projections on its end to form oil spaces at the ends of the casing for the passage of the oil to the piston rod, and means for pressing the telescoping parts of the casings together to compress the packing material, substantially as and for the purpose specified.

3. In a piston rod packing the combination of, a stuffing box, a gland, means for advancing the gland within the stuffing box to compress the packing, an oil cup communicating with the stuffing box about midway of its ends, flexible gaskets, one at each end of the stuffing box, a metal washer for each gasket, and a packing of slightly smaller diameter than the stuffing box composed of two parts which are placed end to end, each part comprising textile packing and an inner and outer cap for inclosing the said packing, the opposing ends of the inner caps having circular projections, substantially as and for the purpose set forth.

In testimony whereof I affix my signature in presence of two witnesses.

CYRUS S. DEAN.

Witnesses:
 VAN BUREN HILLYARD,
 R. MENTEL.